US011971852B2

(12) United States Patent
Genno et al.

(10) Patent No.: US 11,971,852 B2
(45) Date of Patent: Apr. 30, 2024

(54) FILE MANAGEMENT DEVICE, FILE MANAGEMENT METHOD, AND NON-TRANSITORY COMPUTER READABLE MEDIUM

(71) Applicant: PFU LIMITED, Ishikawa (JP)

(72) Inventors: Reiko Genno, Ishikawa (JP); Katsuhito Shimazaki, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 32 days.

(21) Appl. No.: 17/612,482

(22) PCT Filed: May 31, 2019

(86) PCT No.: PCT/JP2019/021728
§ 371 (c)(1),
(2) Date: Nov. 18, 2021

(87) PCT Pub. No.: WO2020/240820
PCT Pub. Date: Dec. 3, 2020

(65) Prior Publication Data
US 2022/0222209 A1 Jul. 14, 2022

(51) Int. Cl.
*G06F 16/00* (2019.01)
*G06F 16/11* (2019.01)
(Continued)

(52) U.S. Cl.
CPC ............ *G06F 16/16* (2019.01); *G06F 16/122* (2019.01); *G06F 16/13* (2019.01); *G06F 16/152* (2019.01)

(58) Field of Classification Search
None
See application file for complete search history.

(56) References Cited

U.S. PATENT DOCUMENTS 9,002,777 B1 * 4/2015 Muddu ............... G06F 7/00
707/694
2007/0043690 A1 * 2/2007 Inakoshi ............ G06F 16/90
(Continued)

FOREIGN PATENT DOCUMENTS

JP    2007-52615 A    3/2007
JP    2007-52744 A    3/2007
(Continued)

OTHER PUBLICATIONS

Notice of Reasons for Refusal issued in corresponding Japanese Application No. 2021-521729, dated Jul. 29, 2022 w/English Translation.
(Continued)

*Primary Examiner* — Hasanul Mobin
(74) *Attorney, Agent, or Firm* — Rimon P.C.

(57) ABSTRACT

A file management device comprising a memory; and a processor coupled to the memory and the processor configured to: a common feature extracting unit that extracts a feature common to a plurality of data files to which a same tag is provided from the data files; a tagging rule storage DB that stores a feature extracted by the common feature extracting unit and the tag provided to the data files in association with each other as a tagging rule; and a tag providing unit that provides a tag to a newly input data file based on the tagging rule stored in the tagging rule storage DB.

8 Claims, 21 Drawing Sheets

(51) Int. Cl.
　　　*G06F 16/13*　　　(2019.01)
　　　*G06F 16/14*　　　(2019.01)
　　　*G06F 16/16*　　　(2019.01)

(56) References Cited

U.S. PATENT DOCUMENTS

| | | | | |
|---|---|---|---|---|
| 2011/0209196 | A1* | 8/2011 | Kennedy | G06F 21/44 |
| | | | | 726/1 |
| 2013/0275391 | A1* | 10/2013 | Batwara | G06F 16/125 |
| | | | | 707/689 |
| 2015/0242735 | A1* | 8/2015 | Hasegawa | G06F 3/1288 |
| | | | | 358/1.15 |
| 2015/0381847 | A1* | 12/2015 | Takamori | H04N 1/00567 |
| | | | | 358/475 |
| 2022/0222209 | A1* | 7/2022 | Genno | G06F 16/13 |

FOREIGN PATENT DOCUMENTS

| | | | |
|---|---|---|---|
| JP | 2011154469 | A | 8/2011 |
| JP | 2013-251610 | A | 12/2013 |
| JP | 2016071412 | A | 5/2016 |
| JP | 2019040260 | A | 3/2019 |

OTHER PUBLICATIONS

International Search Report issued in corresponding International Application No. PCT/JP2019/021728, dated Aug. 20, 2019 w/English Translation.

* cited by examiner

FILE MANAGEMENT DEVICE 5

FIG. 4A

| No. | TAG NAME | CONDITIONS | | | |
|---|---|---|---|---|---|
| | | KEYWORD | DOCUMENT DATE | SIZE | ... |
| 1 | CONFERENCE | "REGULAR CONFERENCE" | WEDNESDAY | A4 | |
| 2 | RECEIPT | "TOTAL AMOUNT" "RECEIPT" | – | – | |
| 3 | SEPTEMBER EXPENDITURE | "EXPENSE" "APPLICATION" | SEPTEMBER 2018 | B5 | |
| 4 | ○○ COMPANY | "○○ COMPANY" | – | BUSINESS CARD SIZE | |
| | | | | | |

TAGGING RULE

TAGGING RULE

FIG. 4B

TAGGING RULE OF TAG "ESTIMATE"

| No. | ITEM | CONDITION CANDIDATE | CONDITIONS |
|---|---|---|---|
| 1 | KEYWORD | PFU CORPORATION, MESSRS., ..., ESTIMATE, ESTIMATION DATE, SUBJECT, ..., AICHI PREFECTURE, PREVIOUS, CLAIMED AMOUNT..., TOTAL AMOUNT, ..., | ESTIMATE ESTIMATION DATE SUBJECT TOTAL AMOUNT |
| 2 | DOCUMENT DATE | 2017/11/4, 2017/11, 2017, SATURDAY, ... | 2017/11 |
| 3 | IMAGE SIZE | 210mm × 300mm, 210mm, 310mm | 210mm × 300mm |
| 4 | ... | ... | ... |

TAGGING RULE OF TAG "ESTIMATE"

FIG. 4C

[Estimate form in rotated orientation containing the following fields:]

TO PFU CORPORATION

ESTIMATE

ESTIMATE NO.　#1212
ESTIMATION DATE　Nov 4, 2017

PERSON IN CHARGE:　DOMESTIC　SALES DIVISION

SUBJECT　: PURCHASE OF EQUIPMENT

ESTIMATE IS AS FOLLOWS

TOTAL AMOUNT　¥62,640　(TAX INCLUDED)

HARUYAMA CORPORATION
〒322-1121
1st FLOOR, CHIYODA, SOTCHINO BUILDING,
NAGOYA,　AICHI
322-1121, JAPAN
TEL 03-322-1233
E-Mail
FAX
PERSON IN CHARGE:
SHOTA TANIHARA

| PREVIOUS CLAIMED AMOUNT | CURRENT | DEPOSIT AMOUNT | CURRENT | ESTIMATE AMOUNT | QUANTITY | DISCOUNT AMOUNT | SUBTOTAL | CONSUMPTION TAX AMOUNT | DEDUCTED AMOUNT | TOTAL AMOUNT |
|---|---|---|---|---|---|---|---|---|---|---|
|  |  |  |  | ¥64,056 |  |  | ¥64,056 | ¥5,124 | ¥6,540 | ¥62,640 |

| No. | DATE | DESCRIPTION | UNIT PRICE | AMOUNT | REMARKS |
|---|---|---|---|---|---|
| 1 | 2017/11 | DESKTOP PC | 34,043 | 34,043 |  |

FEATURES EXTRACTED BY COMMON FEATURE EXTRACTING UNIT 502

FIG. 5A

| No. | KEYWORD | DESCRIPTION COORDINATE |
|---|---|---|
| (FORMAT) | CHARACTER STRING | UPPER LEFT (X1, Y1) - LOWER RIGHT (X2, Y2) |
| 1 | CLAIMS | (514, 115) - (682,178) |
| 2 | PAYEE | (298, 1351) - (437,1403) |
| 3 | AAA CORPORATION | (972, 213) - (1216,274) |
| ... | ... | ... |

KEYWORD AND POSITION INFORMATION OF KEYWORD

FIG. 5B

| No. | DATE | DESCRIPTION COORDINATE |
|---|---|---|
| (FORMAT) | YYYY/MM/DD | UPPER LEFT (X1, Y1) - LOWER RIGHT (X2, Y2) |
| 1 | 2019/02/10 | (931, 182) - (1502,225) |
| 2 | 2019/03/31 | (328, 1451) - (877,1493) |
| ... | ... | ... |

DATE AND POSITION INFORMATION OF DATE

FIG. 5C

| No. | VERTICAL LENGTH | LATERAL LENGTH | NUMBER OF COLORS USED | (OTHERS) |
|---|---|---|---|---|
| 1 | 1491 | 1896 | 3 | ... |

IMAGE SIZE, NUMBER OF COLORS USED, ETC.

REGISTRATION AND UPDATING PROCESS OF TAGGING RULE (S10)

CUSTOMIZED SCREEN CALLOUT EXAMPLE 1 OF TAGGIN RULE

CUSTOMIZED SCREEN EXAMPLE OF TAGGING RULE BY USER

CUSTOMIZED SCREEN CALLOUT EXAMPLE 2 OF TAGGING RULE

CUSTOMIZED SCREEN CALLOUT EXAMPLE 3 OF TAGGING RULE

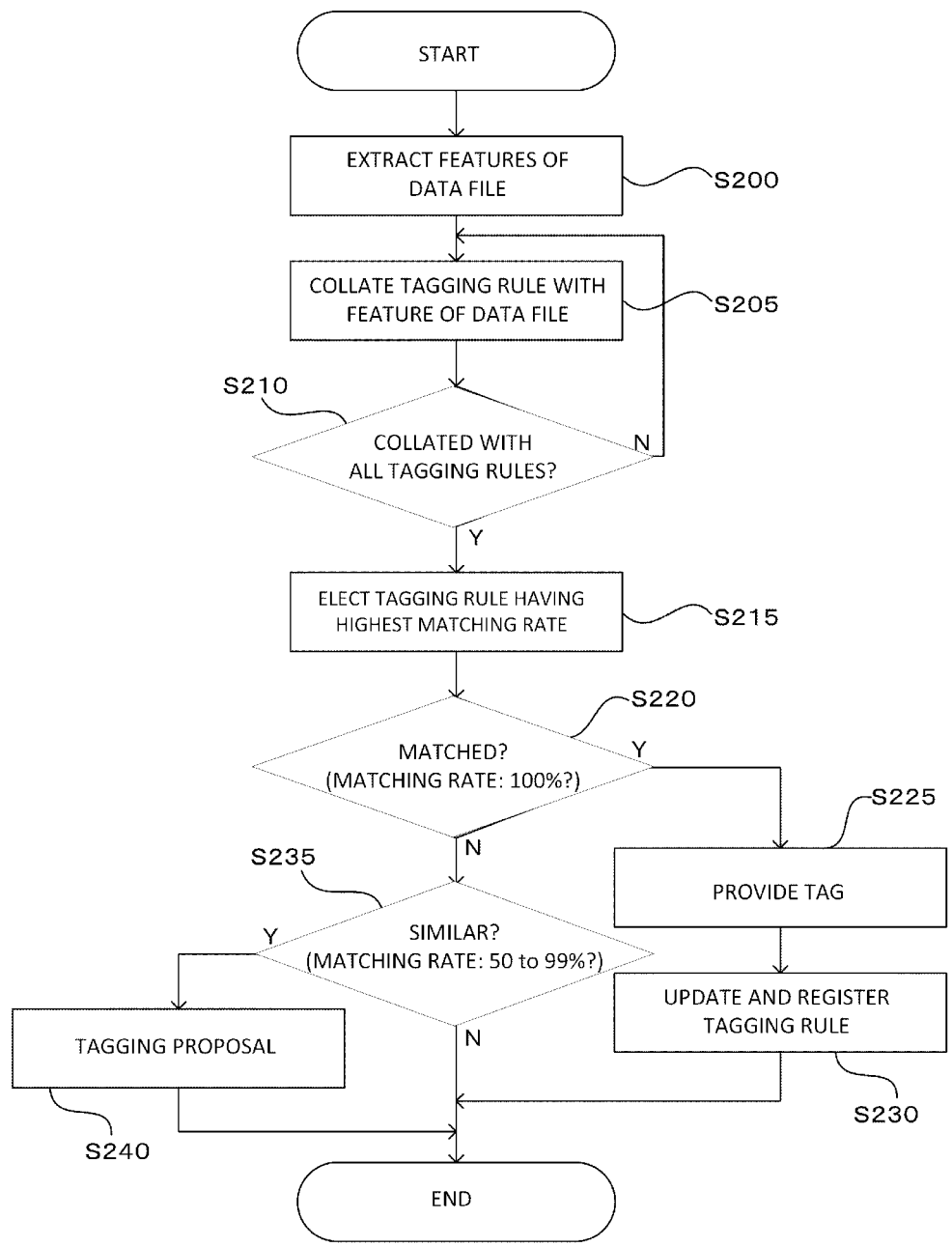

UPDATING PROCESS OF TAGGING RULE ACCORDING TO RESPONSE OF USER TO TAGGING PROPOSAL (S30)

RESPONSE OPERATION SCREEN OF USER FOR TAGGING PROPOSAL

FIG. 13B

BEFORE UPDATE → AFTER UPDATE

| | FREQUENCY | CLOSENESS | POSITION | TOTAL | RANKING |
|---|---|---|---|---|---|
| AMOUNT | 10 | 10 | 9 | 29 | 1 |
| TRANSFER | 10 | 10 | 9 | 29 | 1 |
| TOKYO | 10 | 10 | 8 | 28 | 3 |
| BELOW | 10 | 10 | 8 | 28 | 3 |
| DUE DATE | 10 | 10 | 8 | 28 | 3 |
| CLAIMS | 10 | 10 | 7 | 27 | 6 |
| TAX AMOUNT | 10 | 10 | 7 | 27 | 6 |

| FREQUENCY | CLOSENESS | POSITION | TOTAL | RANKING |
|---|---|---|---|---|
| 10 | 10 | 8 | 28 | 2 |
| 10 | 10 | 8 | 28 | 2 |
| 7 | 9 | 6 | 22 | 6 |
| 7 | 9 | 6 | 22 | 6 |
| 10 | 10 | 7 | 27 | 5 |
| 10 | 10 | 9 | 29 | 1 |
| 10 | 10 | 8 | 28 | 2 |

SCORE OF KEYWORD OF CONDITION CANDIDATE

FIG. 13C

| No. | TAG NAME | TAGGING RULE | | |
|---|---|---|---|---|
| | | CONDITIONS | | |
| | | KEYWORD (ORDER OF COMBINED SCORE) | DOCUMENT DATE | SIZE | ... |
| 1 | CLAIMS (2018) | "AMOUNT" & "TRANSFER" & "TOKYO" & "BELOW" & "DUE DATE" | 2018/10 | A4 |

↓ UPDATE

| No. | TAG NAME | CONDITIONS | | |
|---|---|---|---|---|
| 1 | CLAIMS (2018) | "CLAIM" & "AMOUNT" & "TRANSFER" & "TAX AMOUNT" & "DUE DATE" | 2018 | A4 |

UPDATE EXAMPLE OF TAGGING RULE

FIG. 14A
"CLAIM" TAGGING RULE
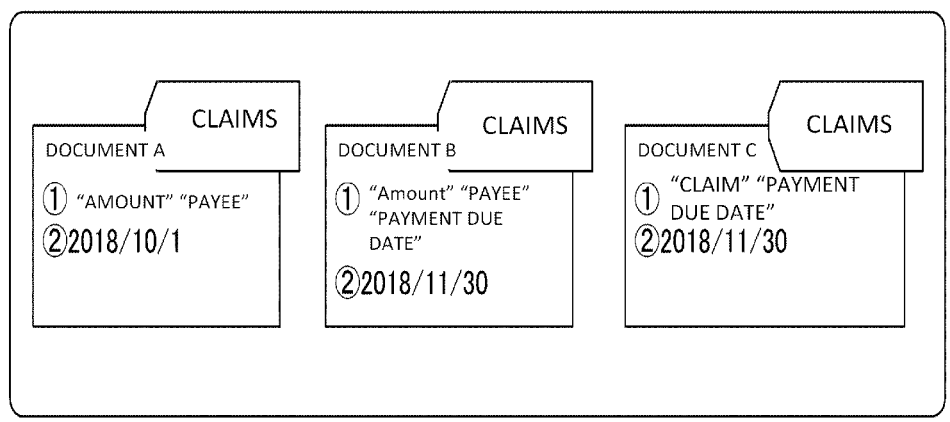
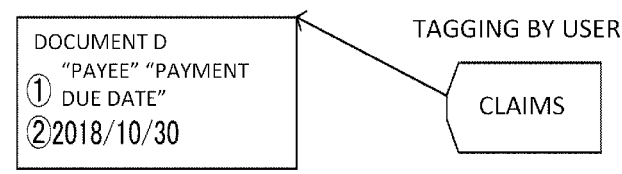
CONDITION CANDIDATE OF TAGGING RULE OF "CLAIM" AND DOCUMENT D

FIG. 14B

| | FREQUENCY | CLOSENESS | POSITION | TOTAL | DOCUMENT A | DOCUMENT B | DOCUMENT C | DOCUMENT D | RULE NO |
|---|---|---|---|---|---|---|---|---|---|
| CLAIMS | 8 | 9 | 8 | 25 | O | O | O | | 1 |
| PAYEE | 5 | 10 | 9 | 24 | O | O | | O | 2 |
| PAYMENT DUE DATE | 8 | 10 | 8 | 24 | | O | | O | 2 |
| AMOUNT | 3 | 8 | 5 | 16 | O | | | | |
| ... | | | | | | | | | |

SCORE OF KEYWORD OF CONDITION CANDIDATE

FIG. 14C

TAGGING RULE

| No. | TAG NAME | CONDITIONS | | |
|---|---|---|---|---|
| | | KEYWORD | DOCUMENT DATE | SIZE |
| 1 | CLAIMS | "CLAIM" | 2018 | — |

ADD RULE →

| | | | | |
|---|---|---|---|---|
| 1 | CLAIMS | "CLAIM" | 2018 | — |
| 2 | CLAIMS | "PAYEE" & "PAYMENT DUE DATE" | 2018 | — |

UPDATE EXAMPLE OF TAGGING RULE

FIG. 15B

TAGGING RULE

| No. | TAG NAME | CONDITIONS | | |
|---|---|---|---|---|
| | | KEYWORD (ORDER OF COMBINED SCORE) | DOCUMENT DATE | SIZE |
| 1 | ○○ COMPANY_CLAIM | "CLAIM" & "PAYEE" & "PAYMENT DUE DATE" & "CLAIMED AMOUNT" & "ITEM OF GOODS" | — | — |

TAGGING RULE OF "○○ COMPANY_CLAIM"

FIG. 15C

| | DOCUMENT E | DOCUMENT F | DOCUMENT G | FREQUENCY | CLOSENESS | POSITION | SPECIFIC | TOTAL | RANKING |
|---|---|---|---|---|---|---|---|---|---|
| CLAIMS | ○ | ○ | ○ | 10 | 10 | 9 | 0 | 29 | 2 |
| PAYEE | ○ | ○ | ○ | 10 | 10 | 9 | 0 | 29 | 2 |
| PAYMENT DUE DATE | ○ | ○ | ○ | 10 | 10 | 8 | 0 | 28 | 4 |
| AMOUNT | ○ | ○ | ○ | 10 | 10 | 8 | 0 | 28 | 5 |
| ITEM OF GOODS | ○ | ○ | × | 10 | 10 | 7 | 0 | 27 | 6 |
| AA COMPANY | ○ | ○ | | 10 | 10 | 6 | 10 | 36 | 1 |
| ... | | | | | | | | | |

SCORE OF KEYWORD OF CONDITION CANDIDATE

FILE MANAGEMENT DEVICE, FILE MANAGEMENT METHOD, AND NON-TRANSITORY COMPUTER READABLE MEDIUM

CROSS REFERENCE TO RELATED APPLICATIONS

This application is the U.S. National Phase under 35 U.S.C. § 371 of International Application No. PCT/JP2019/021728, filed on May 31, 2019, the entire contents of which is hereby incorporated by reference.

The present invention relates to a file management device, a file management method, and a program.

BACKGROUND ART

For example, Patent Literature 1 discloses a document processing device including a classification rule registering means for registering a combination of a first rule and a second rule applied to the first rule as a classification rule for classifying a document; and a classification rule integrating means for integrating a plurality of different classification rules registered by the classification rule registering means while excluding overlapping contents between the plurality of different classification rules.

In addition, Patent Literature 2 discloses a classification rule creation support method executed by a computer, the method including the steps of storing a new data item and a category of the new data item in a storage device; extracting a feature pattern including a condition including a feature element of the new data item stored in the storage device and a corresponding category from data stored in a correct data storage unit that stores the data item and the category of the data item, and storing the feature pattern in a feature pattern storage unit; and grouping the feature pattern stored in the feature pattern storage unit into a first set matching the category of the new data item stored in the storage device and a second set not matching the category of the new data item stored in the storage device, and storing a grouping result in a group data storage unit.

Furthermore, Patent Literature 3 discloses a document processing device including a storage means; an input means to which document image data representing a document is input; a specifying means that performs layout analysis on the document image data input to the input means and specifies a layout of the document representing the document image data; a determination means that performs character analysis on the document image data input to the input means and determines an attribute of each described item of the document representing the document image data; a generation means that specifies a hierarchical structure between the described items on the basis of the layout specified by the specifying means and the attribute of each described item determined by the determination means and generates rule data representing the hierarchical structure; and a writing means that writes the rule data generated by the generation means to the storage unit.

CITATIONS LIST

Patent Literature

Patent Literature 1: Japanese Laid-Open Patent No. 2013-251610
Patent Literature 2: Japanese Laid-Open Patent No. 2007-052744
Patent Literature 3: Japanese Laid-Open Patent No. 2007-052615

SUMMARY OF INVENTION

Technical Problems

An object is to provide a file management device capable of appropriately classifying data files.

Solutions to Problems

A file management device according to the present invention includes a common feature extracting unit that extracts a feature common to a plurality of data files to which a same tag is provided from the data files; a rule storage unit that stores a feature extracted by the common feature extracting unit and the tag provided to the data files in association with each other as a provision rule; and a tag providing unit that provides a tag to a newly input data file based on the provision rule stored in the rule storage unit.

Preferably, the tag providing unit searches for a feature registered as a provision rule in the rule storage unit from a newly input data file, and when any feature is found, provides a tag associated with the feature to the newly input data file.

Preferably, in a case where a part of a feature registered as a provision rule is found from a newly input data file, the tag providing unit proposes a tag associated with the feature to a user, and provides the tag according to an operation of the user.

Preferably, a rule updating unit that updates a provision rule such that a feature of a newly input data file matches a feature of the provision rule when a proposed tag is adopted by the user is provided.

Preferably, a rule updating unit that updates a provision rule such that a feature of a newly input data file does not match a feature of the provision rule when a proposed tag is not adopted by the user is provided.

Preferably, the common feature extracting unit extracts, as the features, at least one of a character string, a date, an image size, and the number of colors used for an image.

Preferably, the provision rule stored in the rule storage unit includes a plurality of determination elements, and the rule updating unit selects a feature registered as the determination element of the provision rule from among the features common to the plurality of data files based on at least one of an appearance frequency, a closeness, and an appearance position and a uniqueness.

A file management method according to the present invention includes a common feature extracting step of extracting a feature common to a plurality of data files to which a same tag is provided from the data files; a rule storing step of storing a feature extracted by the common feature extracting step and the tag provided to the data files in association with each other as a provision rule; and a tag providing step of providing a tag to a newly input data file based on the provision rule stored in the rule storing step.

A program according to the present invention causes a computer to execute a common feature extracting step of extracting a feature common to a plurality of data files to which a same tag is provided from the data files; a rule storing step of storing a feature extracted by the common feature extracting step and the tag provided to the data files in association with each other as a provision rule; and a tag providing step of providing a tag to a newly input data file based on the provision rule stored in the rule storing step.

Advantageous Effects of Invention

The data files can be appropriately classified.

BRIEF DESCRIPTION OF DRAWINGS

FIG. 4A is a table for describing a tagging rule, FIG. 4B is a table for describing a tagging rule of the tag "estimate", and FIG. 4C is a diagram illustrating features extracted by the common feature extracting unit 502.

FIG. 5A is a table illustrating a keyword and position information of the keyword, FIG. 5B is a table illustrating date and position information of the date, and FIG. 5C is a table illustrating an image size and the number of colors used.

FIG. 10 is a flowchart illustrating tagging and tag proposing process (S20) by the file management device 5.

FIG. 13B is a table illustrating scores of keywords of the condition candidates, and FIG. 13C is an update example of a tagging rule.

FIG. 14A is a diagram illustrating a tagging rule of the "claim" and features of the document D, FIG. 14B is a table illustrating scores of keywords of the condition candidates, and FIG. 14C is an update example of a tagging rule.

FIG. 15B is a diagram illustrating the tagging rule of "○○ company_ claim", FIG. 15C is a table illustrating the scores of the keywords of the condition candidates.

DESCRIPTION OF EMBODIMENTS

Hereinafter, an embodiment of the present invention will be described with reference to the drawings.

Figure 1:
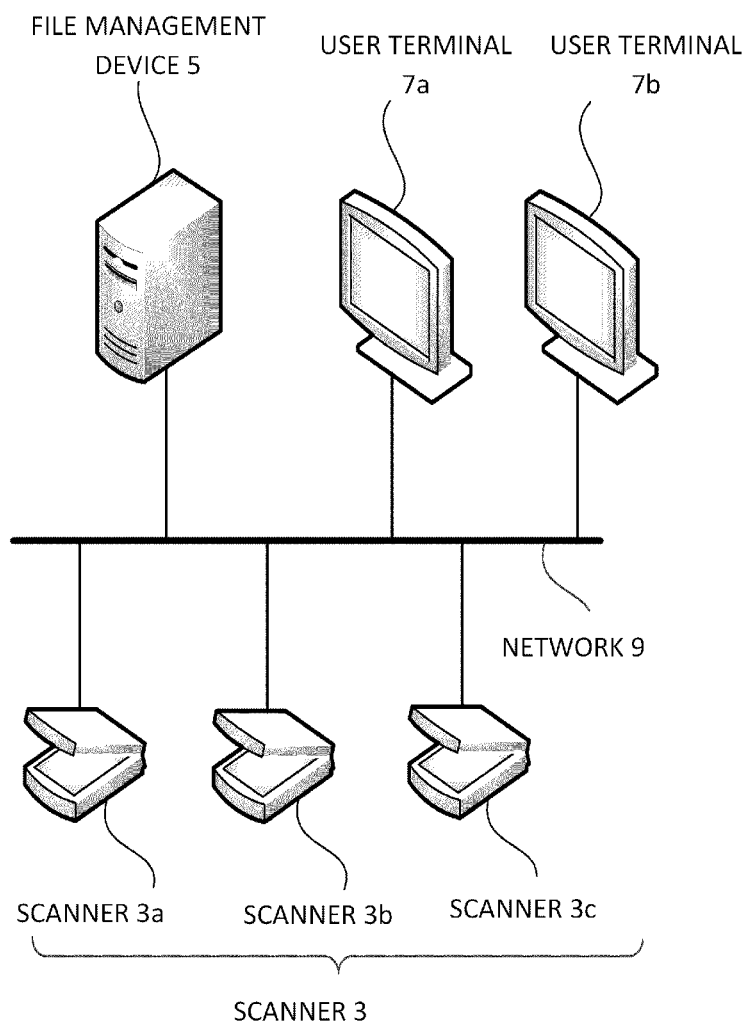
FIG. 1 is a diagram illustrating an overall configuration of a file management system 1.

FIG. 1 is a diagram illustrating an overall configuration of a file management system 1.

As illustrated in FIG. 1, the file management system 1 includes a plurality of scanners 3a, 3b, 3c, a file management device 5, and a user terminal 7, which are connected to each other via a network 9. The scanner 3a, the scanner 3b, and the scanner 3c are collectively referred to as a scanner 3, and the user terminal 7a and the user terminal 7b are collectively referred to as a user terminal 7.

The scanner 3 is an optical reading device, and transmits acquired image data to the file management device 5.

The file management device 5 is a computer terminal, and provides a tag for classifying image data received from the scanner 3 to the image data. Specifically, the file management device 5 holds a rule for tagging, which is a tagging rule, and provides a suitable tag to a data file based on the tagging rule and a feature of the data file obtained by performing OCR processing on the image data. Further, the file management device 5 generates and updates the tagging rule according to the user's operation. Note that the tagging rule is an example of provision rule according to the present invention.

The user terminal 7 is a computer terminal operated by a user, and displays a user interface provided by the file management device 5.

Figure 2:
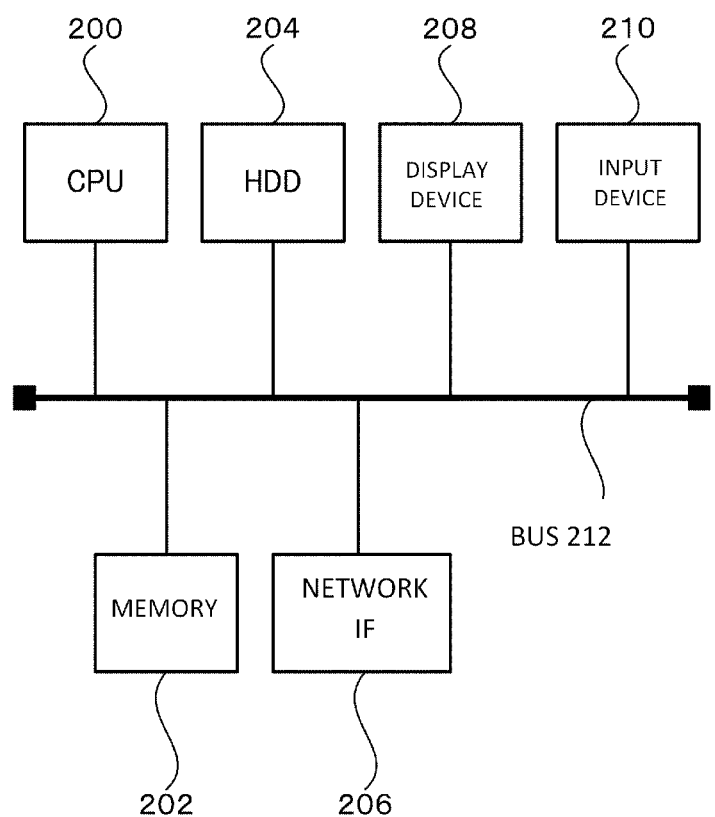
FIG. 2 is a diagram illustrating a hardware configuration of a file management device 5.

FIG. 2 is a diagram illustrating a hardware configuration of the file management device 5.

As illustrated in FIG. 2, the file management device 5 includes a CPU 200, a memory 202, an HDD 204, a network interface 206 (network IF 206), a display device 208, and an input device 210, which components are connected to each other via a bus 212.

The CPU 200 is, for example, a central processing unit.

The memory 202 is, for example, a volatile memory, and functions as a main storage device.

The HDD 204 is, for example, a hard disk drive device, and stores a computer program (for example, a file management program 50 in FIG. 3) and other data files (for example, a tagging rule database 600 of FIG. 3) as a nonvolatile recording device.

The network IF 206 is an interface for wired or wireless communication, and for example, realizes communication in an internal network 9.

The display device 208 is, for example, a liquid crystal display.

The input device 210 is, for example, a keyboard and a mouse.

Figure 3:
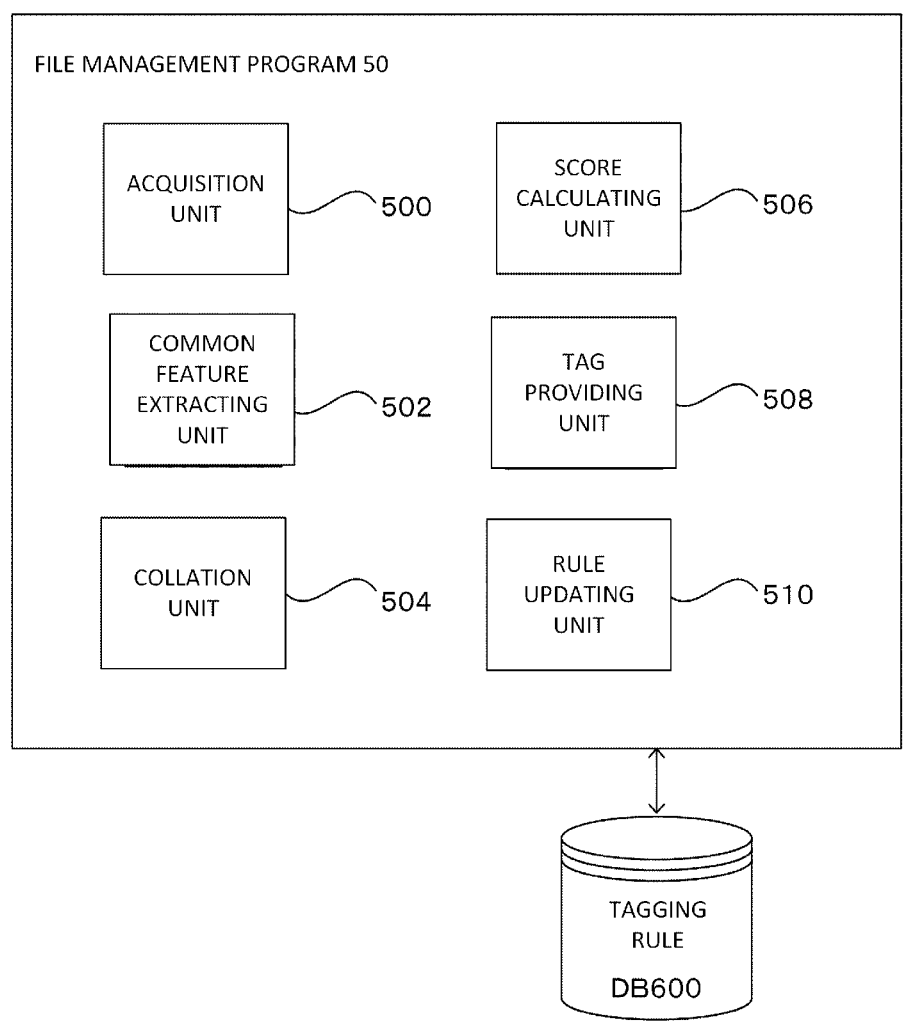
FIG. 3 is a diagram illustrating a functional configuration of the file management device 5.

FIG. 3 is a diagram illustrating a functional configuration of the file management device 5.

As illustrated in FIG. 3, in the file management device 5 of the present example, the file management program 50 is installed, and the tagging rule database 600 (tagging rule DB 600) is configured.

The file management program 50 includes an acquisition unit 500, a common feature extracting unit 502, a collation unit 504, a score calculating unit 506, a tag providing unit 508, and a rule updating unit 510.

A part or all of the file management program 50 may be realized by hardware such as ASIC, or may be realized by borrowing a part of a function of an operating system (OS).

In the file management program 50, the acquisition unit 500 acquires image data read by the scanner 3.

The common feature extracting unit 502 extracts features common to a plurality of data files to which the same tag is provided from the data files. For example, a data file refers to that in which optical character recognition (OCR) processing is performed on the image data. Specifically, the common feature extracting unit 502 performs the OCR processing on the image data acquired from the acquisition unit 500, and extracts a feature of the data file based on an OCR processing result. More specifically, the common feature extracting unit 502 extracts, as features, at least one of a character string described in a data file, a date, an image size of the data file, and the number of colors used for an image of the data file.

Here, the tagging rule DB 600 will be described.

The tagging rule DB 600 stores the features extracted by the common feature extracting unit 502 and the tags provided to these data files in association with each other as a tagging rule. Specifically, the tagging rule DB 600 stores a tag name and "condition candidates" and "conditions" associated with the tag name. The "condition" is a constraint for providing a "tag name" associated with a data file, and is a common feature extracted from a plurality of data files to which the same tag is provided. Similarly, the "condition candidate" is a common feature extracted from a plurality of data files, and the "condition" is selected from among the "condition candidates". The tagging rule DB 600 is an example of a rule storage unit according to the present invention.

The collation unit 504 collates newly input data file with the feature registered as the tagging rule. The newly input data file refers to a data file in which OCR processing is performed on the image data acquired by the acquisition unit 500. Specifically, the collation unit 504 determines a matching degree between the data file subjected to the OCR processing by the common feature extracting unit 502 and the feature registered in the tagging rule stored in the tagging rule DB 600.

The score calculating unit 506 calculates a score to be a determination element of each "condition candidate", and selects the "condition" from among the "condition candidates" having a score greater than or equal to a threshold value. Specifically, the score calculating unit 506 calculates scores of the appearance frequency, the closeness, the appearance position, and the uniqueness of each "condition candidate", adds the scores while weighting each score, and calculates the superiority of the "condition candidate".

The tag providing unit 508 provides a tag to a newly input data file based on a tagging rule stored in the tagging rule DB 600.

Specifically, the tag providing unit 508 searches for a feature registered as a tagging rule from a newly input data file, and provides a tag associated with this feature to the newly input data file when any feature is found.

More specifically, in a case where a part of a feature registered as a tagging rule is found from a newly input data file, the tag providing unit 508 proposes a tag associated with this feature to the user, and provides the tag according to an operation of the user. A case where a part of the features is found from the newly input data file refers to a case where the matching rate between the features extracted by the common feature extracting unit 502 and the features of the tagging rule is 50% to 99%.

The rule updating unit 510 generates and updates the tagging rule. Specifically, the rule updating unit 510 selects a feature to be registered as a determination element of the tagging rule based on at least one of the appearance frequency, the closeness, and the appearance position and the uniqueness from among the features common to the plurality of data files. More specifically, the rule updating unit 510 selects the "condition" from the "condition candidates" in which the total score calculated by the score calculating unit 506 is higher than the threshold value, and updates the tagging rule.

Furthermore, specifically, when the collation unit 504 determines that the newly input data file matches a part of the features registered as the tagging rule and the user adopts the proposed tag, the rule updating unit 510 updates the tagging rule such that the newly input data file matches the features registered as the tagging rule.

Moreover, when the collation unit 504 determines that the newly input data file matches a part of the features registered as the tagging rule and the user refuses the proposed tag, the rule updating unit 510 updates the tagging rule such that the newly input data file does not match the features registered as the tagging rule.

Next, the tagging rule stored in the tagging rule DB 600 will be described.

FIG. 4A is a table for describing a tagging rule, FIG. 4B is a table for describing a tagging rule of the tag "estimate", and FIG. 4C is a diagram illustrating features extracted by the common feature extracting unit 502.

As illustrated in FIG. 4A, the tagging rule has a "tag name" and a "condition" associated with the "tag name". The "tag name" is a name for classifying a data file. The "condition" is a constraint for providing a "tag name", and is a common feature extracted from data files to which the same tag is provided. When the data file retrieved next time corresponds to the "condition", the file management device 5 automatically provides the "tag name" associated with the "condition" to the retrieved data file.

Furthermore, the "condition" is selected from the "condition candidates". The "condition candidate" is a feature extracted from the data file by the common feature extracting unit 502. Specifically, as illustrated in FIG. 4B, "condition candidate" and "condition" are associated with the tag "estimate", and the "condition candidate" is not included in the tagging "condition", but is a feature extracted from a data file stored as a candidate of the "condition" for updating the tagging rule.

More specifically, the common feature extracting unit 502 extracts the "condition candidates" for each item from the data file illustrated in FIG. 4C, as illustrated in FIG. 4B. The score calculating unit 506 calculates a score representing the superiority of each condition candidate, and the rule updating unit 510 selects the "condition" from among the "condition candidates" having a score of greater than or equal to a threshold value on the basis of the total score of each "condition candidate".

FIG. 5 is a diagram illustrating condition candidates extracted from a data file.

As illustrated in FIG. 5, the "condition candidate" is a feature extracted from a data file by the common feature extracting unit 502, and includes a character string and vertical and horizontal lengths of an image. Specifically, the "condition candidate" includes a word (keyword) in the sentence of the data file, a value of the document date, a value of the vertical and horizontal length of the image, and the like.

For the keyword, as illustrated in FIG. 5A, the common feature extracting unit 502 records a character string of the keyword in the data file and position information in which the character string is described as features. Specifically, the common feature extracting unit 502 performs the morphological analysis on the data file based on the result of the OCR processing, and sets the divided words as the keyword condition candidates. The common feature extracting unit 502 sets, as keyword conditions, a maximum of five keyword condition candidates whose scores satisfy a specific condition among the keyword condition candidates.

With respect to the document date, as illustrated in FIG. 5B, the common feature extracting unit 502 decomposes the date in the data file into elements of year/month/day, and records position information in which the date is described as a feature. In a case where a date is written in the document, the common feature extracting unit 502 sets the respective elements of year, month, day, and day of the week as a document date condition candidate. The common feature extracting unit 502 sets, as the document date condition, at most one of the elements whose score satisfies the specific condition among the document date condition candidates.

With respect to the image size, as illustrated in FIG. 5C, the common feature extracting unit 502 sets the vertical and horizontal lengths of the data file as image size condition candidates, and sets, as the image size condition, at most one of the elements whose score satisfies the specific condition among the image size condition candidates.

In addition, in addition to the keyword, the value of the document date, and the vertical and horizontal lengths of the image, the rule updating unit 510 may use "format", "attribute value of business card or receipt (company name or address)", and "color of image" as condition candidates, and create a tagging rule on the condition of matching or similarity thereof.

The tag providing unit 508 provides a tag to a data file that satisfies the "condition". Specifically, the tag providing unit 508 provides the tag in a case where the feature of the data file matches the keyword of the tagging rule, is similar to the document date, and is similar to the vertical and horizontal lengths of the image.

For example, the condition of the keyword is satisfied by a specific character string being described in the data file. The similar condition of the document date is satisfied by the date described in the data file having a certain feature. The similar condition of the vertical and horizontal lengths of the image is satisfied by the vertical and horizontal sizes of the image having a certain feature.

Next, a method of calculating the score of the condition candidate will be described.

Each condition candidate has a score for appearance frequency, closeness, appearance position, and uniqueness. Each score increases or decreases between 0 and 10.

The score of the appearance frequency is calculated based on how many data files a certain feature appears in all the tagged data files. The score of the appearance frequency increases as the number of appearances increases. The score is 10 for a feature common to all the tagged data files.

The score of closeness is calculated based on whether a certain feature corresponds to a recently input data file. The initial value of the score of closeness is a maximum value (10). In addition, when the feature does not apply to the added data file, the score of closeness decreases.

The score of the appearance position is calculated based on whether or not the appearance position is described at a close position on the data file. The score of the appearance position is the maximum value (10) for the same place, and the score of the appearance position decreases as the position moves away.

The score of the uniqueness is calculated based on whether or not the feature is unique to the tagging rule. When a tagging proposal is made to a data file corresponding to the tagging rule and when the user refuses the proposal, the score calculating unit 506 adds the uniqueness scores of the "condition" and the "condition candidate" that exist in the tagging rule but do not exist in the data file.

The score calculating unit 506 calculates the scores of the appearance frequency, the closeness, the appearance position, and the uniqueness, adds the scores while weighting each score, and calculates the superiority of the "condition candidate". The score calculating unit 506 calculates the total score by using the expression "total score=α×score of appearance frequency+β×score of closeness+γ×score of appearance position+δ×score of uniqueness". The rule updating unit 510 selects a "condition" from condition candidates in which the total score calculated by the score calculating unit 506 is higher than a threshold value.

Figure 6:
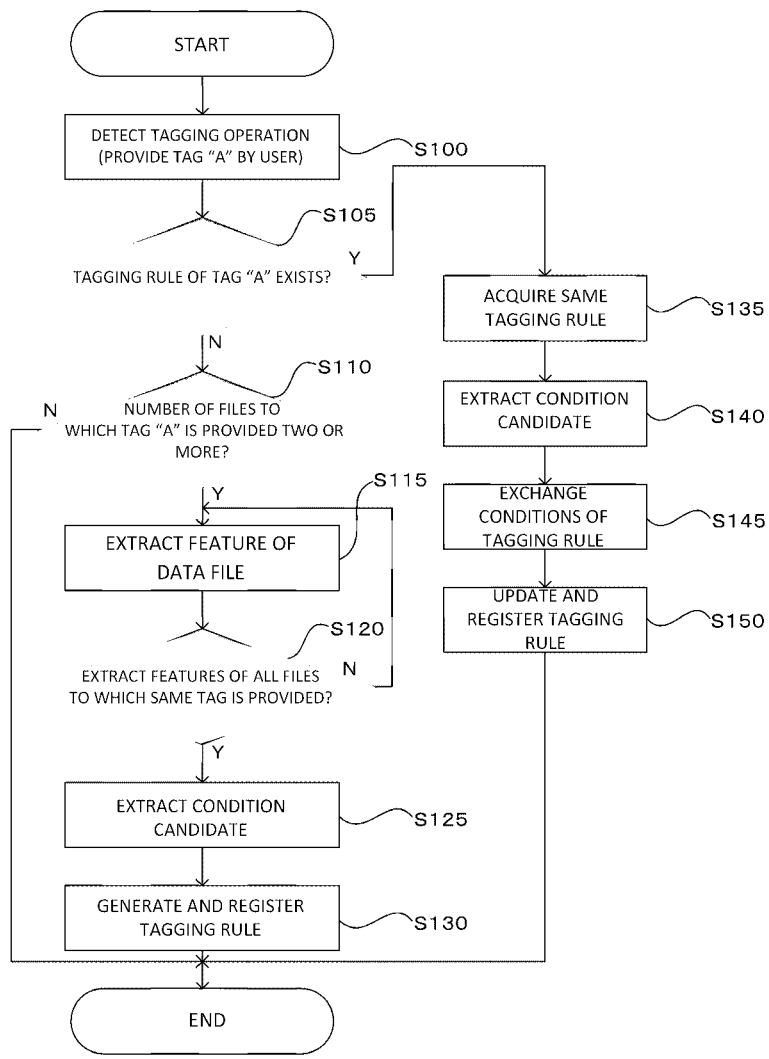
FIG. 6 is a flowchart illustrating a process of registering and updating a tagging rule by the file management device 5 (S10).

FIG. 6 is a flowchart illustrating the process of registering and updating a tagging rule by the file management device 5 (S10). In FIG. 6, the registration and update of the tagging rule when a user provides tag "A" to the data file will be described.

Figure 7:
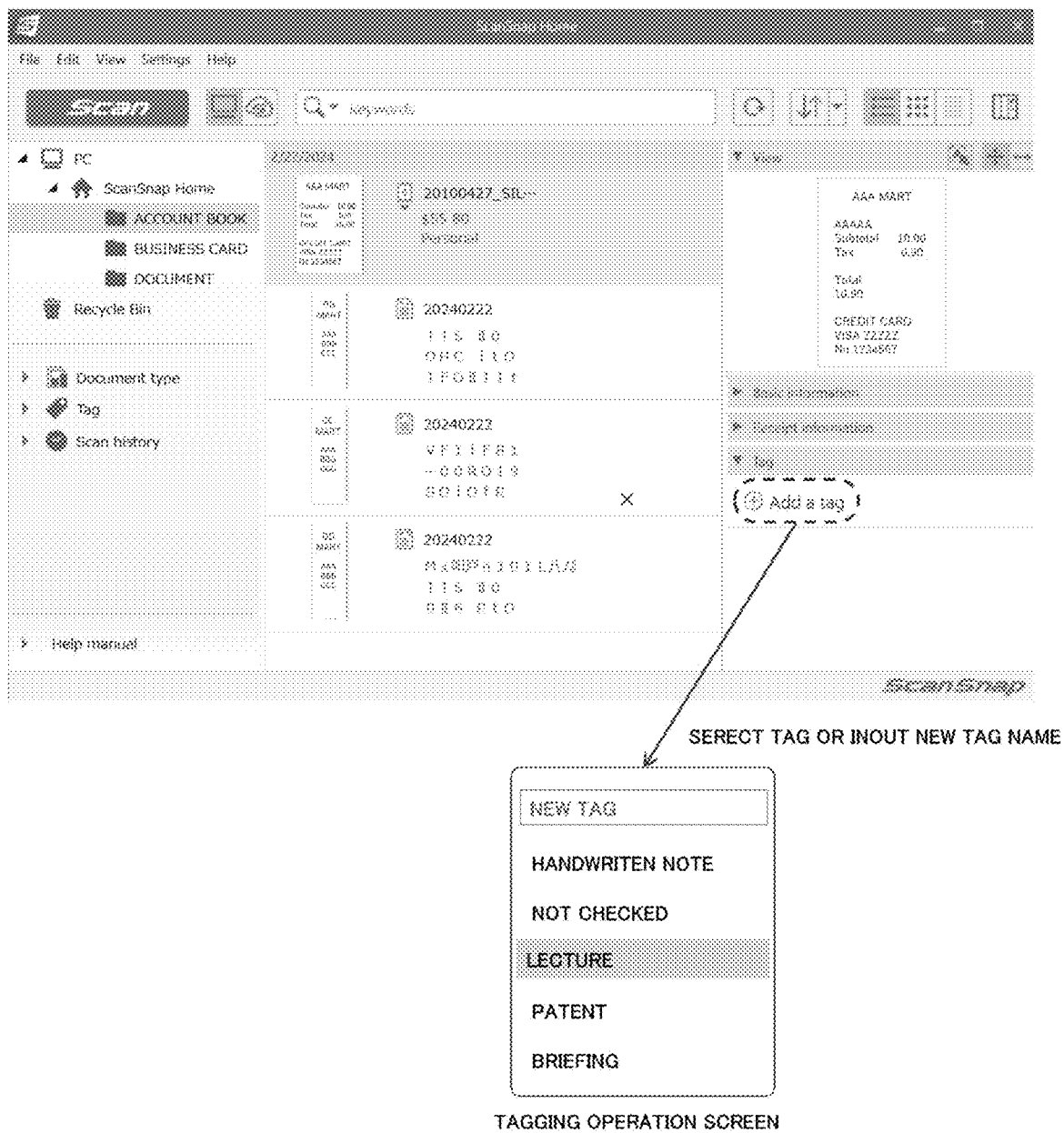
FIG. 7 is a screen example of a tagging operation by the user.

As illustrated in FIG. 6, in step 100 (S100), the rule updating unit 510 detects that a tag is provided to the data file by the tagging operation of the user. Specifically, as illustrated in FIG. 7, the user selects a tag or inputs a new tag name on the tagging operation screen, and performs a tagging operation (providing a tag "A") on the data file, and the rule updating unit 510 detects the tagging operation by the user.

In step 105 (S105), the collation unit 504 searches the tagging rule DB 600 for the presence or absence of a tagging rule of tag "A". When the tagging rule exists, the collation unit 504 proceeds to S135, and when the tagging rule does not exist, the collation unit 504 proceeds to S110.

In step 110 (S110), when there are two or more data files to which the tag "A" has been added by the user and which have been searched by the collation unit 504, the collation unit 504 proceeds to S115. When there is only one data file to which the tag "A" is provided by the user, the rule updating unit 510 terminates the process of registering and updating the tagging rule (S10). If there is only one data file to which the tag "A" is provided, a common feature in the data file to which the same tag "A" is provided cannot be extracted, and thus the tagging rule is not generated.

In step 115 (S115), the common feature extracting unit 502 extracts features of the data file to which the tag "A" is provided. Specifically, the common feature extracting unit 502 extracts at least one of a character string, a date, an image size, and the number of colors used for an image of a data file.

In step 120 (S120), when the common feature extracting unit 502 extracts the features of all the data files to which the tag "A" is provided, the process of registering and updating the tagging rule (S10) proceeds to S125, and when the features of all the data files are not extracted, the process of registering and updating the tagging rule (S10) proceeds to S115.

In step 125 (S125), the common feature extracting unit 502 extracts a feature common to all the data files to which the tag "A" is provided as a "condition candidate".

In step 130 (S130), the score calculating unit 506 calculates scores of the appearance frequency, the closeness, the appearance position, and the uniqueness of each "condition candidate", and a total score. The rule updating unit 510 selects a "condition candidate" in which a total score is high and in which each score is greater than or equal to a threshold value as a "condition", generates a tagging rule of tag "A", and registers the tagging rule in tagging rule DB 600.

In step 135 (S135), when the tagging rule of the tag "A" exists, the collation unit 504 acquires the tagging rule of the tag "A".

In step 140 (S140), the common feature extracting unit 502 extracts a feature of a data file to which a tag "A" is provided by the user. Specifically, the common feature extracting unit 502 acquires at least one of a character string, a date, an image size, and the number of colors used for an image of a data file.

In step 145 (S145), the rule updating unit 510 deletes the condition not corresponding to the feature extracted by common feature extracting unit 502 in S140 from the "condition" of the tagging rule acquired by the collation unit 504 in S135. Furthermore, in S135, the score calculating unit 506 recalculates the score of each "condition candidate" acquired in S140 including the "condition candidate" of the tagging rule acquired by the collation unit 504. In a case where the fixed condition is set by user customization, a condition candidate for which the fixed condition is set is selected as the "condition" regardless of the value of the score. Furthermore, the rule updating unit 510 additionally selects, as a "condition", a condition candidate in which a total score is high and in which each score is greater than or equal to a threshold value from the other condition candidates.

In step 150 (S150), the rule updating unit 510 replaces the "condition" of the tagging rule of the tag "A" with the selected new "condition" and updates the tagging rule. A tagging rule with a higher matching rate can be generated by replacing with a new "condition".

Next, customization of the tagging rule by the user will be described.

Figure 8A:
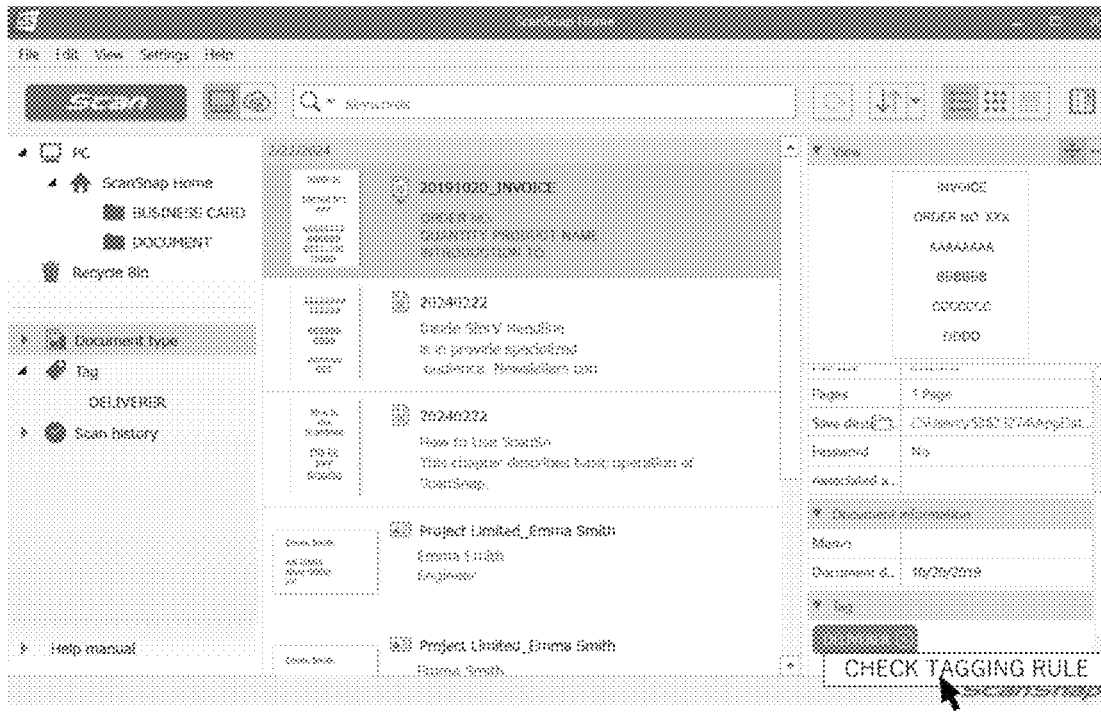
FIG. 8A is a callout example 1 of a customized screen of a tagging rule.
Figure 8B:
FIG. 8B is an example of a customized screen of a tagging rule by a user.

The user can call out a customized screen of the tagging rule at an arbitrary timing to check and customize the tagging rule. Specifically, as illustrated in FIG. 8A, a "check tagging rule" menu is displayed from the tag "invoice", and a customized screen of the tagging rule is displayed according to the user's selection. Furthermore, as illustrated in FIG. 8B, the user can customize the keyword associated with the tag, such as adding, deleting, and changing the date. Furthermore, the user can set (fixed condition) to fix the "condition" associated with the tag. The "condition" set as the fixed condition is always held as the "condition" without being removed when the rule is updated by the tagging operation of the user.

Figure 9A:
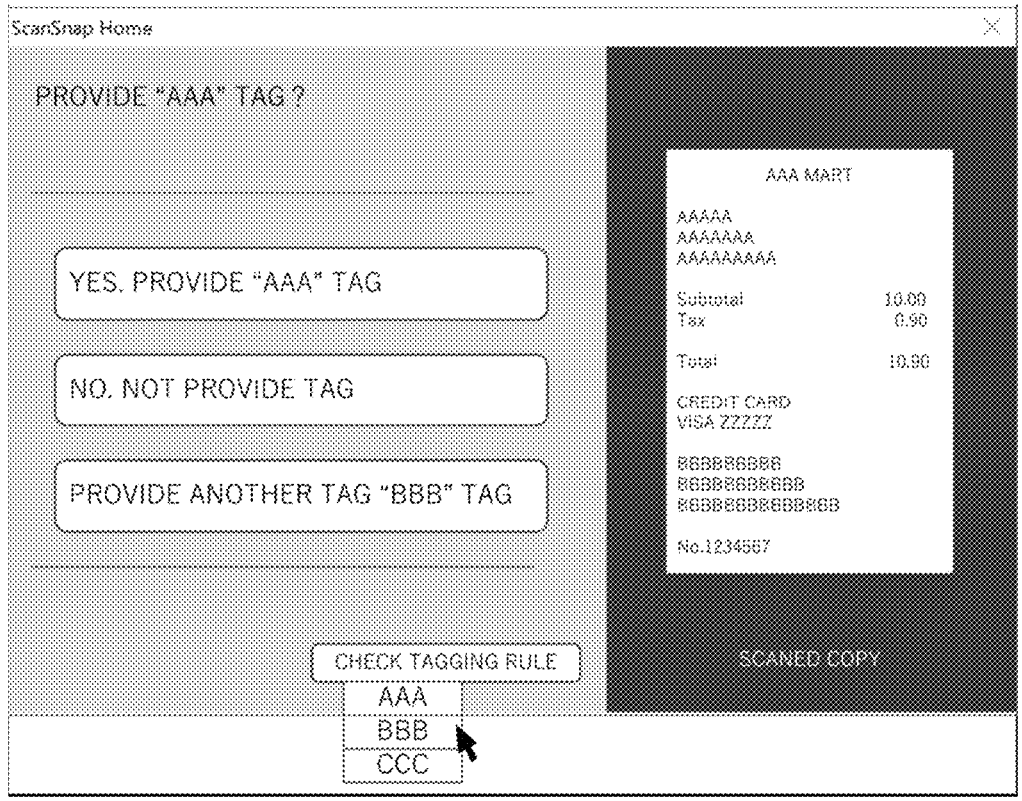
FIG. 9A is a callout example 2 of a customized screen of a tagging rule.
Figure 9B:
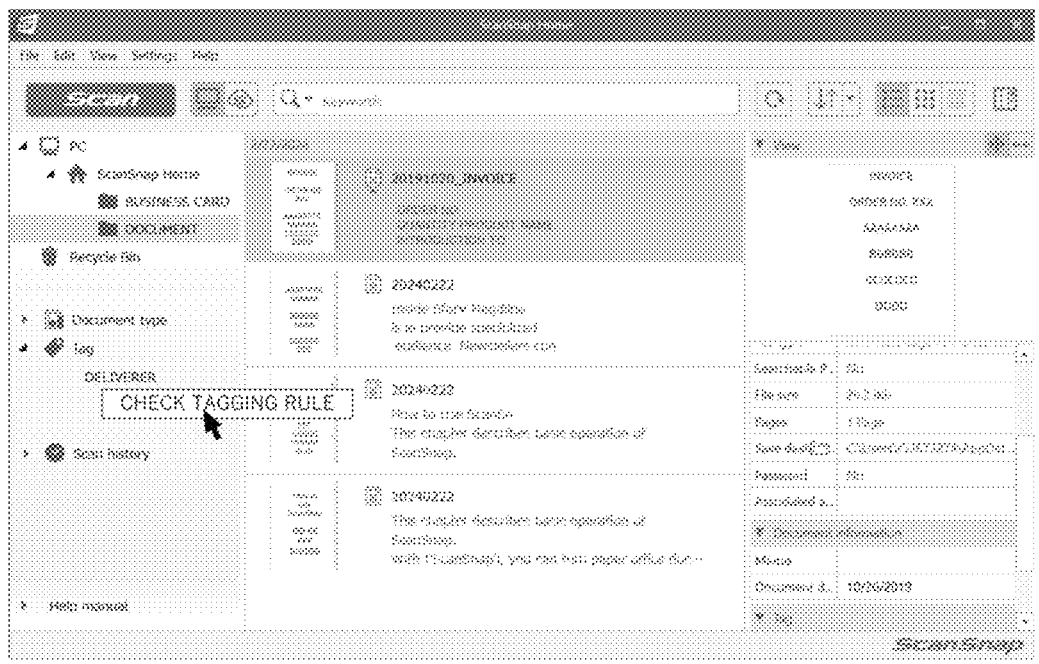
FIG. 9B is a callout example 3 of the customized screen of the tagging rule.

Furthermore, as illustrated in FIGS. 9A and 9B, the customized screen of the tagging rule can be called out from the tag list which is the search result of the tag when the tag is proposed to the user. As described above, since the user can check the tagging rule and modify the tagging rule as necessary, even a tagging rule that cannot be handled by updating the tagging rule by the file management device 5 can be generated.

FIG. 10 is a flowchart illustrating the tagging and tag proposing process (S20) by the file management device 5.

As illustrated in FIG. 10, in step 200 (S200), the acquisition unit 500 acquires image data of a document scanned by the scanner 3. The common feature extracting unit 502 acquires the data file in which the OCR processing is performed on the image data acquired by acquisition unit 500. The common feature extracting unit 502 extracts at least one of a character string, a date, an image size, and the number of colors used for an image of a data file as a feature.

In step 205 (S205), the collation unit 504 collates the feature of the data file with the tagging rule stored in the tagging rule DB 600.

In step 210 (S210), the collation unit 504 proceeds to S215 when the feature of the data file is collated with all the tagging rules, and proceeds to S205 when the feature of the data file is not collated with all the tagging rules.

In step 215 (S215), the collation unit 504 selects the tagging rule having the highest matching rate with the feature of the data file as a result of the collation.

In step 220 (S220), when the matching rate of the tagging rules selected in S215 is 100%, the process proceeds to S225, and when the matching rate is not 100%, the process proceeds to S235.

In step 225 (S225), the tag providing unit 508 provides a tag of a tagging rule with the matching rate of 100% to the data file.

In step 230 (S230), the rule updating unit 510 updates and registers the tagging rule. Specifically, the condition that does not correspond to the feature extracted by the common feature extracting unit 502 is deleted from the tagging rules selected in S215. Furthermore, the "condition" is selected based on the score of each condition candidate, the fixed condition, and other condition candidates, and the "condition" of the tagging rule is replaced with the selected new "condition" and registered in the tagging rule DB 600.

In step 235 (S235), the tag providing unit 508 proceeds to S240 when the tagging rule selected in S215 and the feature of the data file have a matching rate of greater than or equal to 50% and less than 99% (similar), and terminates the process without providing a tag when the matching rate is less than or equal to 49%.

In step 240 (S240), the tag providing unit 508 proposes providing the tag of the tagging rule determined to be similar to the data file, and asks the user to decide whether or not to provide the tag.

Figure 11:
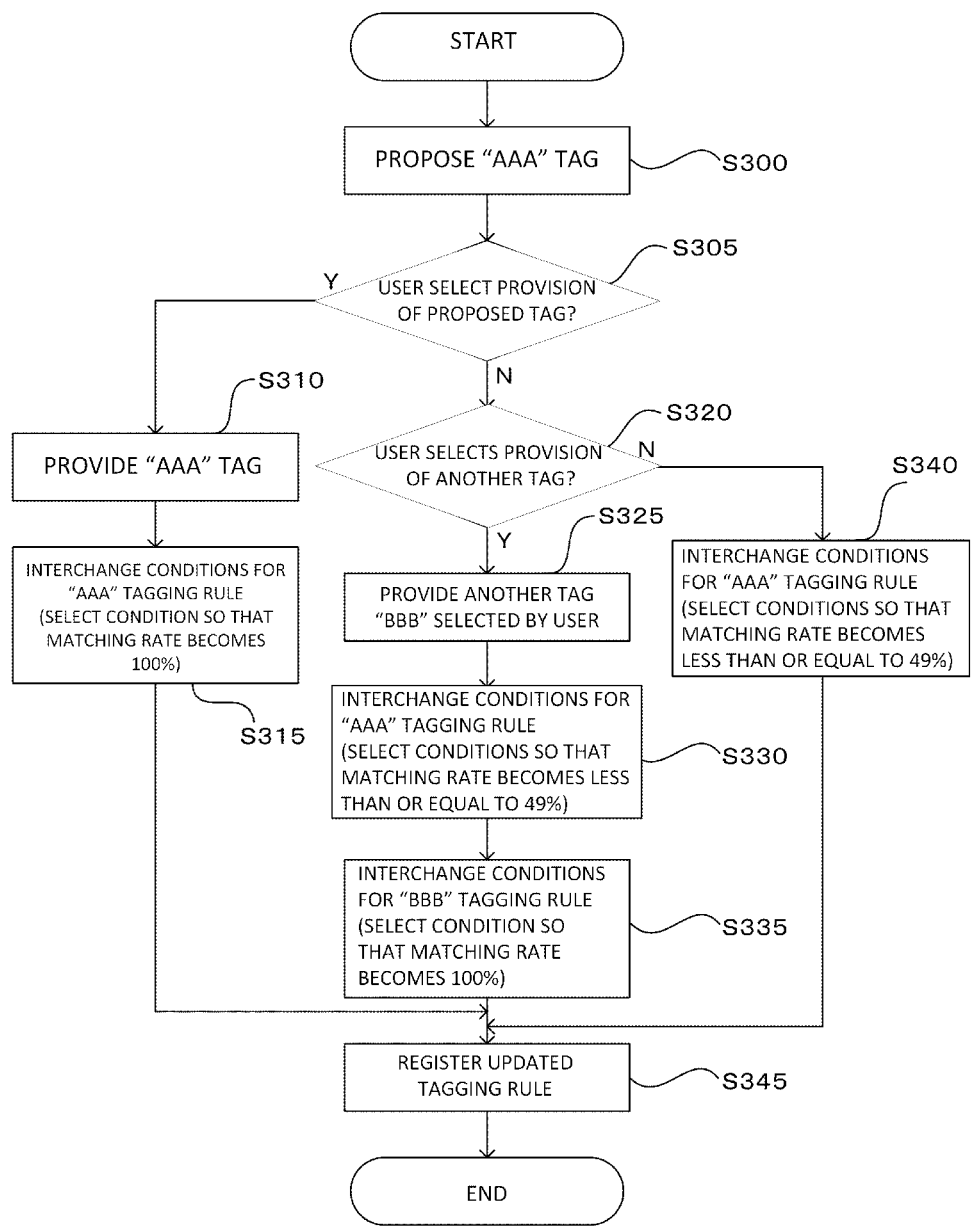
FIG. 11 is a flowchart illustrating a process of updating a tagging rule in accordance with a response of a user to a tagging proposal (S30).

FIG. 11 is a flowchart illustrating a process of updating a tagging rule in accordance with a response of the user to a tagging proposal (S30). In FIG. 11, a case where the file management device 5 proposes the provision of the tag "AAA" to the user will be described.

Figure 12:
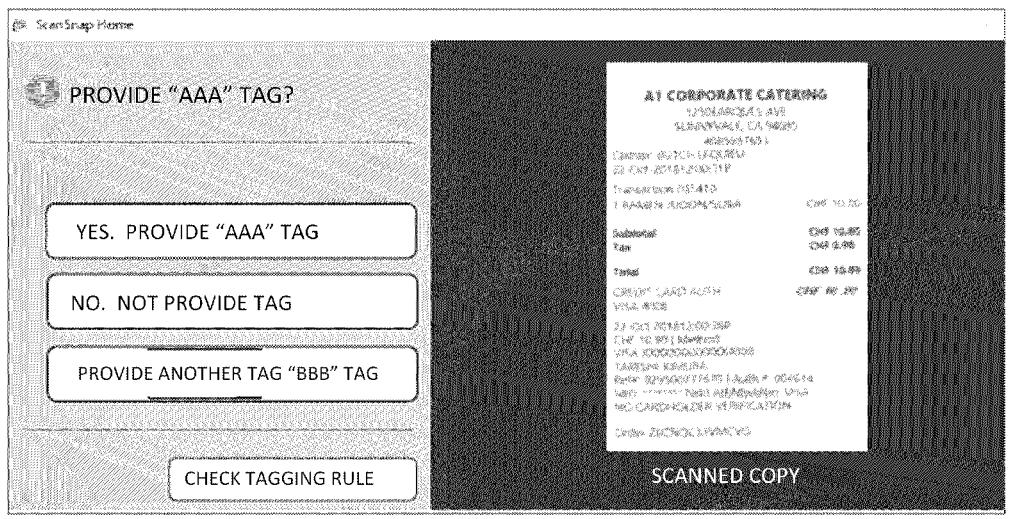
FIG. 12 is a diagram illustrating a user's response operation screen for a tagging proposal.

As illustrated in FIG. 11, in step 300 (S300), the tag providing unit 508 proposes the provision of a tag "AAA" to the user as illustrated in FIG. 12. Specifically, the tag providing unit 508 presents provision of a tag "AAA", no provision of a tag, and provision of another tag as the response operation of the user.

In step 305 (S305), in a case where the user decides that the tag "AAA" is valid in response to the tag proposal by the tag providing unit 508, the process proceeds to S310, and in a case where the user does not decide that the tag "AAA" is valid, the process proceeds to S320.

In step 310 (S310), the tag providing unit 508 provides a tag "AAA" to a data file.

In step 315 (S315), the rule updating unit 510 updates and registers the tagging rule of the tag "AAA". Specifically, the rule updating unit 510 selects the "condition" such that a matching rate between the feature of the data file and the tagging rule of the tag "AAA" becomes 100%, and replaces the "condition" of the tagging rule of the existing "AAA" with the "condition". Instead of replacing the "condition", the rule updating unit 510 may increase the matching rate by partially deleting the "condition" (for example, a condition is relieved such that a character string satisfies a condition when two characters match from when three characters match).

In a case where the user has selected providing a tag different from "AAA" in step 320 (S320), here, the process proceeds to S325 when the user selects to provide the tag "BBB", and otherwise, the process proceeds to S340.

In step 325 (S325), the tag providing unit 508 provides a tag "BBB" to a data file.

In step 330 (S330), when the user selects "provide tag "BBB"", the rule updating unit 510 updates the tagging rule of the tag "AAA" so that a matching rate between the feature of the data file and the tagging rule of the tag "AAA" becomes less than or equal to 49%. Specifically, the rule updating unit 510 selects the "condition" such that a matching rate between the feature of the data file and the tagging rule of the tag "AAA" becomes less than or equal to 49%. Furthermore, the rule updating unit 510 replaces the selected "condition" with the "condition" of the tagging rule of the existing "AAA". This prevents the feature of the data file and the tagging rule of the tag "AAA" from being determined to be similar. In addition, instead of "replacing" the condition, the rule updating unit 510 may add the "condition" (strengthening the condition) to lower the matching rate.

In step 335 (S335), the rule updating unit 510 updates the tagging rule of the tag "BBB" so that a matching rate between the feature of the data file and the tagging rule of the tag "BBB" becomes 100%. Specifically, the rule updating unit 510 selects the "condition" such that a matching rate between the feature of the data file and the tagging rule of the tag "BBB" becomes 100%. Furthermore, the rule updating unit 510 replaces the selected "condition" with the "condition" of the tagging rule of the existing "BBB". Accordingly, it is determined that the feature of the data file matches the tagging rule of the tag "BBB". In addition, instead of "replacing" the condition, the rule updating unit 510 may partially delete the "condition" (relieving the condition) to raise the matching rate.

In step 340 (S340), when the user selects "not provide tag "AAA"", the rule updating unit 510 updates the tagging rule of the tag "AAA" so that a matching rate between the feature of the data file and the tagging rule of the tag "AAA" becomes less than or equal to 49%. More specifically, the rule updating unit 510 selects the "condition" such that a matching rate between the feature of the data file and the tagging rule of the tag "AAA" becomes less than or equal to 49%. Then, the rule updating unit 510 then replaces the selected "condition" with the "condition" of the tagging rule of "AAA". This prevents the feature of the data file and the tagging rule of the tag "AAA" from being determined to be similar. In addition, instead of "replacing" the condition, the rule updating unit 510 may add the "condition" (strengthening the condition) to lower the matching rate.

In step 345 (S345), the rule updating unit 510 registers the replaced "condition" in the tagging rule DB 600 as a condition of the tagging rule.

Next, an update example of the tagging rule in a case where the existing tag "claim (2018)" provided to the document A and the document B is provided to the newly tagging document C will be described.

Figure 13A:
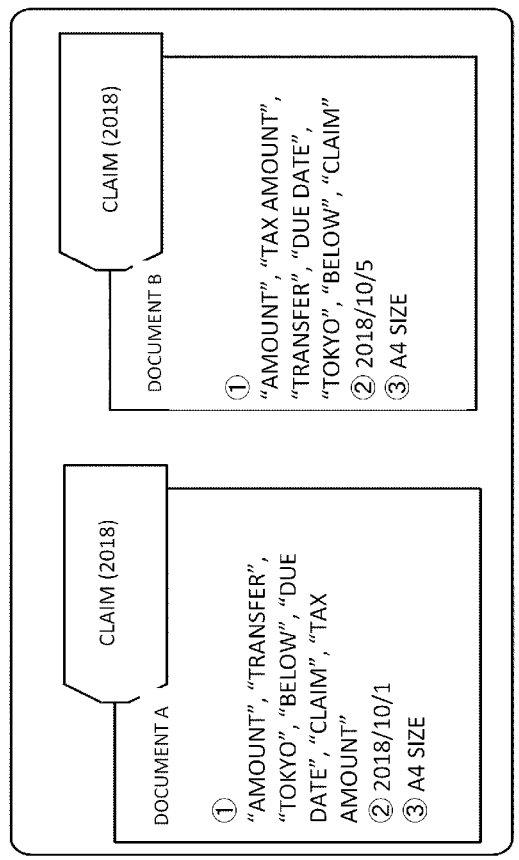
FIG. 13A is a diagram illustrating condition candidates of a tagging rule of "claim (2018)" and the document C.

FIG. 13A is a diagram illustrating a tagging rule of "claim (2018)" and features of the document C, and illustrates keywords, document dates, and sizes of the document A, the document B, and the document C. As illustrated in FIG. 13A, the document C does not include character strings "below" and "Tokyo" as in the documents A and B.

FIG. 13B is a table illustrating scores of keywords of the condition candidates.

FIG. 13C illustrates an update example of the tagging rule data.

The rule updating unit 510 selects a keyword to be adopted as the "condition" based on the score of the "condition candidate" included in the document C. Specifically, as illustrated in FIG. 13B, the appearance frequencies of "below" and "Tokyo" calculated by the score calculating unit 506 decrease from "10" to "7", the closeness decreases from "10" to "9", and the appearance positions of "claim" and "tax amount" are added. As a result, the total score of "below" and "Tokyo" decreases, and the total score of "claim" and "tax amount" increases. Therefore, as illustrated in FIG. 13C, the rule updating unit 510 updates the tagging rule generated based on the documents A and B to the tagging rule for providing a tag "claim (2018)" to a data file having "claim", "amount", "transfer", "tax amount", and "due date" as keywords, "2018" as document date, and "A4" as size.

Next, an update example of the tagging rule in a case where the tagging rule with the matching rate of 100% cannot be generated with only one condition will be described. Specifically, a case where the user provides an existing tag "claim" to the newly tagging document D will be described.

FIG. 14A is a diagram illustrating a tagging rule of "claim" and features of the document D, and illustrates keywords and document dates of the document A, the document B, the document C, and the document D. As illustrated in FIG. 14A, the document D does not include the character string "claim" as in the documents A to C, and the documents A to C and the newly tagging document D do not have a feature of a common data file. That is, the tag "claim" cannot be provided to the document D only by the tagging rule of the existing tag "claim" of No. 1 in FIG. 14C.

FIG. 14B is a table illustrating scores of keywords of the condition candidates.

FIG. 14C illustrates an update example of the tagging rule data.

As illustrated in FIGS. 14B and 14C, the score calculating unit 506 recalculates the score of the keyword of the "condition candidate", and the rule updating unit 510 selects the "payee" and the "payment due date" having a high total score as the "condition" so that the document D corresponds to the tag "claim", and adds the same as the tagging rule of the tag "claim" in addition to the tagging rule (No. 1) before update. Therefore, the rule updating unit 510 registers the conditions "No. 1" and "No. 2" as the tagging rule of the tag "claim". Accordingly, the tag "claim" is provided when the condition of the tagging rule corresponds to "No. 1" or "No. 2".

Next, an update example of the tagging rule in a case where the user refuses the proposal after the tagging is proposed will be described. Specifically, a case where the user refuses the proposal of the existing tag "AA company_claim" for the newly tagging document G which is a claim of BB company will be described.

Figure 15A:
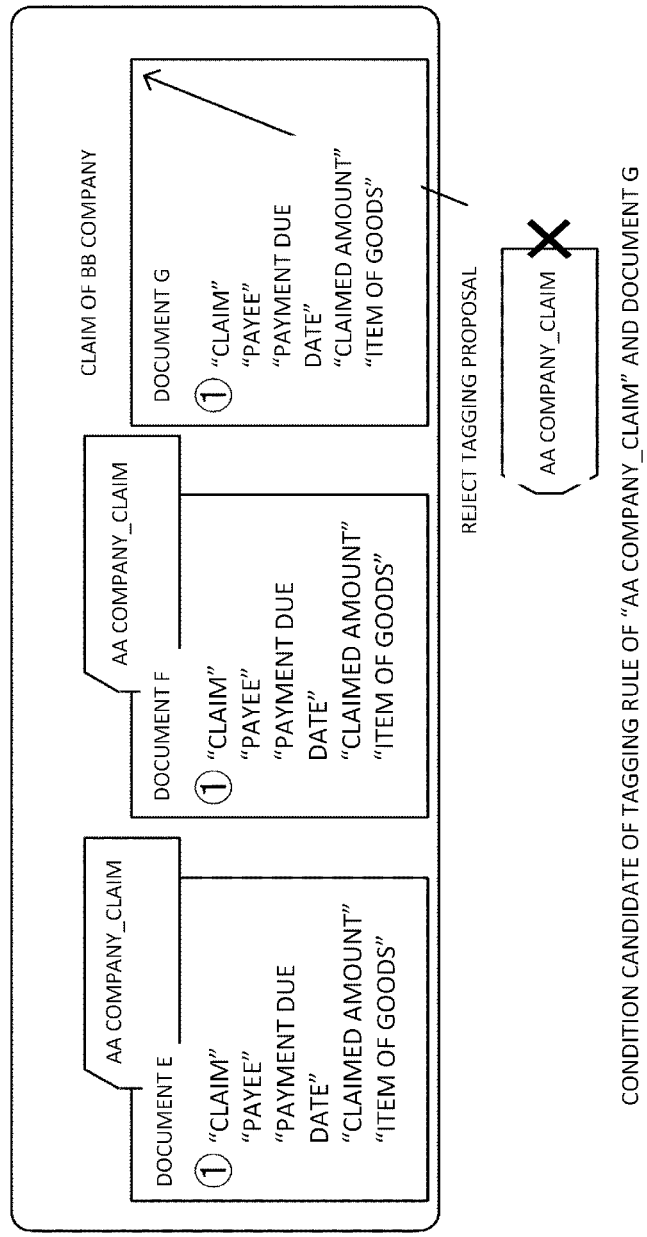
FIG. 15A is a diagram illustrating the tagging rule of "AA company_claim" and the feature of the newly tagging document G which is the claim of the BB company.
Figure 15D:
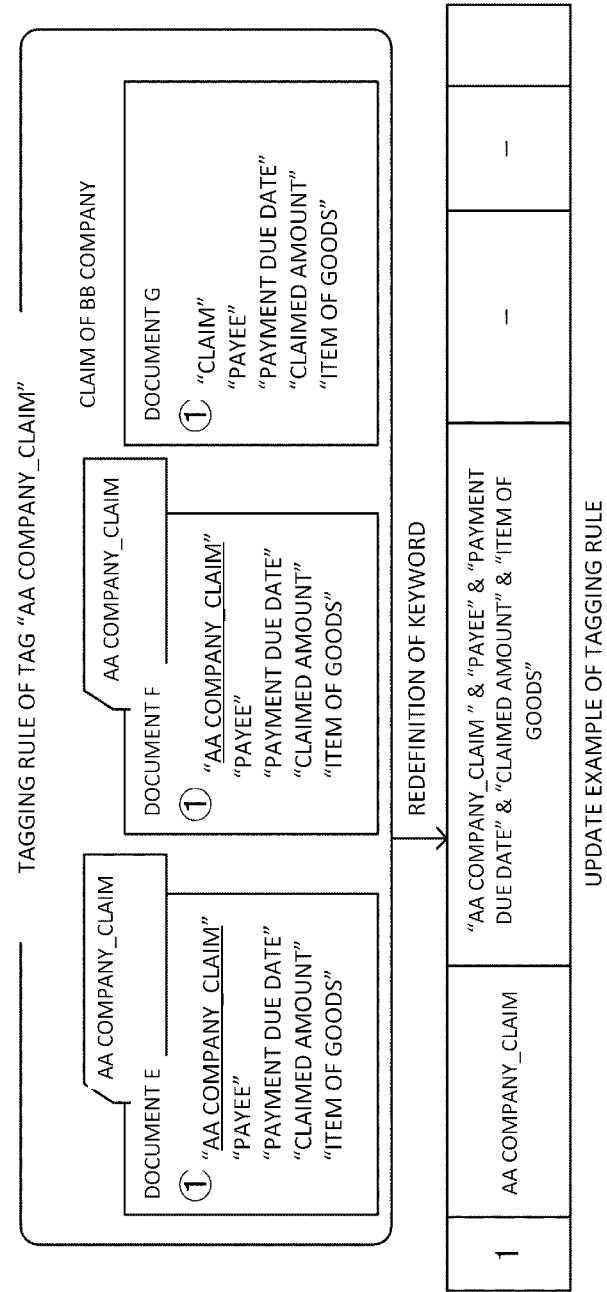
FIG. 15D is an update example of the tagging rule data.

FIG. 15A is a diagram illustrating the tagging rule of "AA company_claim" and the feature of the newly tagging document G which is the claim of the BB company, FIG. 15B is a diagram illustrating the tagging rule of "∘∘ company_claim", FIG. 15C is a table illustrating the scores of the keywords of the condition candidates, and FIG. 15D is an update example of the tagging rule data.

In the tagging rule of "∘∘ company_claim" illustrated in FIG. 15B, a proposal to provide the tag "AA company_claim" also to the claim of the BB company is made.

Therefore, as illustrated in FIG. 15A, the score calculating unit 506 compares the feature of the document G of which tagging is refused with the "condition candidate" of the tagging rule of the tag "AA company_claim". If there is a "condition candidate" not included in the features of the document G among the "condition candidates" of the tagging rule of the tag "AA company_claim", the score calculating unit 506 adds a score of uniqueness of such "condition candidate". Specifically, as illustrated in FIG. 15C, the score calculating unit 506 provides a uniqueness score to "AA company" which is a condition candidate of a keyword included in the document E and the document F but not included in the document G. As a result of recalculation of the score by the score calculating unit 506, as illustrated in FIG. 15D, the rule updating unit 510 updates the tagging rule to a tagging rule having the tag name "AA company_claim" and the keywords ""AA company", "claim", "payee", "payment due date", and "claimed amount"". As a result, the tag providing unit 508 no longer proposes the tag "AA company_claim" to the document G which is the claim of the BB company.

As described above, according to the file management device 5, a tag can be automatically provided to a data file acquired from the scanner 3 without user intervention based on a feature of the data file and a tagging rule. In addition, the user can review the tagging rule managed by the file management device 5, and can modify the tagging rule as necessary. Then, since the tagging rule is updated based on the matching rate between the document to be tagged and the tagging rule, a more accurate tagging rule is established by use.

In the embodiment described above, the file management device 5 provides the tag to the image data read by the scanner 3, but this is not the sole case, and the scanner 3 may have the function of the file management device 5 and read the image data, and provide the tag to the data file. Furthermore, the user terminal 7 may have the function of the file management device 5, and the user terminal 7 may provide a tag to a data file.

REFERENCE SIGNS LIST 1 file management system
3 scanner
5 file management device
50 file management program
500 acquisition unit
502 common feature extracting unit
504 collation unit
506 score calculating unit
508 tag providing unit
510 rule updating unit
600 tagging rule database

The invention claimed is:

1. A file management device comprising:
a memory; and
a processor coupled to the memory and the processor configured to:
  extract, from data files to which same tags are respectively provided, a common feature which is a feature common to the data files having the same tags;
  store the extracted common feature and the tags provided to the data files in association with each other as a provision rule, the provision rule being a rule that indicates a condition used when a tag is provided to a data file having at least a portion of the common feature;
  provide a tag to a newly input data file based on the stored provision rule; and
  search for a feature registered as the provision rule from a newly input data file, and when any feature is found, provides a tag associated with the feature to the newly input data file.

2. The file management device according to claim 1, wherein the processor is further configured to:
  when a part of a feature registered as a provision rule is found from a newly input data file, proposes a tag associated with the feature to a user and provides the tag according to an operation of the user.

3. The file management device according to claim 2, wherein the processor is further configured to:
  update a provision rule such that a feature of a newly input data file matches a feature of the provision rule when the proposed tag is adopted by the user.

4. The file management device according to claim 2, wherein the processor is further configured to:
  update a provision rule such that a feature of a newly input data file does not match a feature of the provision rule when the proposed tag is not adopted by the user.

5. The file management device according to claim 1, wherein the processor is further configured to:
  extract at least one of a character string, a date, an image size, and the number of colors used for an image as the feature.

6. The file management device according to claim 3, wherein the stored provision rule includes a plurality of determination elements, and wherein the processor is further configured to:
  select a feature registered as a determination element of a provision rule from among features common to a plurality of data files, based on at least one of an appearance frequency, a closeness, and an appearance position and a uniqueness.

7. A file management method comprising the steps of:
  extracting, from a plurality of data files to which same tags are respectively provided, a common feature which is a feature common to the data files having the same tags;
  storing the extracted common feature and the tags provided to the data files in association with each other as a provision rule, the provision rule being a rule that indicates a condition used when a tag is provided to a data file having at least a portion of the common feature;
  providing a tag to a newly input data file based on the stored provision rule; and
  searching for a feature registered as the provision rule from a newly input data file, and when any feature is found, provides a tag associated with the feature to the newly input data file.

8. A non-transitory computer-readable recording medium storing thereon a computer program that causes a computer to perform a method comprising:
  extracting, from a plurality of data files to which same tags are respectively provided, a common feature which is a feature common to the data files having the same tags;
  storing the extracted common feature and the tags provided to the data files in association with each other as a provision rule, the provision rule being a rule that indicates a condition used when a tag is provided to a data file having at least a portion of the common feature;
  providing a tag to a newly input data file based on the stored provision rule; and
  searching for a feature registered as the provision rule from a newly input data file, and when any feature is found, provides a tag associated with the feature to the newly input data file.

* * * * *